United States Patent [19]

Foster et al.

[11] Patent Number: 4,937,025
[45] Date of Patent: Jun. 26, 1990

[54] MOLDING APPARATUS AND METHOD

[75] Inventors: Robert D. Foster; Frank G. Weeden, both of Houston, Tex.

[73] Assignee: Hydra Corporation, Houston, Tex.

[21] Appl. No.: 103,052

[22] Filed: Sep. 30, 1987

[51] Int. Cl.$^5$ .................... B29C 43/14; B29C 43/26; B29C 43/36; B29C 43/44

[52] U.S. Cl. .................... 264/120; 264/314; 264/297.1; 425/389; 425/405.1; 425/DIG. 14; 425/DIG. 44

[58] Field of Search ............... 264/120, 112, 113, 314, 264/313, 315, 102, 297.1; 425/405.1, 405.2, 406, 389, 390, 79, 78, DIG. 44, DIG. 14

[56] References Cited

U.S. PATENT DOCUMENTS

| | | | |
|---|---|---|---|
| 2,152,738 | 4/1939 | Jeffery | 425/405.1 |
| 2,838,796 | 6/1958 | Reed | 264/314 |
| 3,593,373 | 7/1971 | Loomis | 425/78 |
| 4,102,956 | 7/1978 | Duperray et al. | 264/112 |
| 4,252,760 | 2/1981 | Foster et al. | 264/120 |
| 4,263,237 | 4/1981 | Weeden et al. | 264/219 |
| 4,349,326 | 9/1982 | Foster et al. | 425/405 R |
| 4,370,120 | 1/1983 | Foster et al. | 425/405 H |
| 4,470,803 | 9/1984 | Foster et al. | 432/5 |
| 4,496,299 | 1/1985 | Pettersson | 264/314 |
| 4,604,252 | 8/1986 | Stigler | 264/120 |
| 4,655,984 | 4/1987 | Hinton et al. | 425/405.1 |
| 4,704,082 | 11/1987 | Buhler et al. | 425/405.1 |

OTHER PUBLICATIONS

MacJewel Tool Development, Technical Manual, FIGS. 3-6 and Parts List.

*Primary Examiner*—Jan H. Silbaugh
*Assistant Examiner*—Mary Lynn Fertig
*Attorney, Agent, or Firm*—Browning, Bushman, Anderson & Brookhart

[57] ABSTRACT

Methods and apparatus for making self-supporting bodies from particulate materials. The apparatus includes a mold with opposed first and second walls defining a particulate chamber therebetween. The second wall is advanceable and retractable toward and away from the first wall. A plurality of chamber reducers may be removably mounted over each of the walls. Thick-walled members can be incrementally built up by pressing successive batches of particulate material at low and high pressures respectively. The chamber reducers can be successively removed between such batches, or can be used to vary the mold for making bodies of different sizes. A long body can be built up in increments, using a shorter mold, by forming a first increment, displacing the increment lengthwise in the mold, adding another batch of particulate material in overlapping relation to the first body increment, and then pressing such other batch to form a second increment bonded to the first. The latter technique is enhanced by applying different forces or pressures to different sections of the second wall along the length of the mold.

49 Claims, 6 Drawing Sheets

MOLDING APPARATUS AND METHOD

BACKGROUND OF THE INVENTION

1. Field of the Invention

The present invention pertains to apparatus and methods for forming articles from particulate materials.

2. Description of the Background

Examples of the kind of apparatus and methods to which the present invention may be applied are given in U.S. Pat. No. 4,252,760 and U.S. Pat. No. 4,263,237.

As explained more fully in these prior patents, one current technique for forming articles of materials such as tetrafluoroethylenes begins with such materials in particulate form. The shapes of the particles are highly irregular. Thus, a batch of such particulate material may be placed in a mold and, more specifically, in a particulate chamber having opposed walls. One of the walls can be advanced and retracted toward and away from the other. For example, the advanceable wall may be the inner part of an elastomeric bladder. Fluid is introduced into the bladder under pressure to advance said inner part.

When the wall is advanced with sufficient force, the particles are compressed, and their irregular surfaces mechanically interlock with one another. The result is a body called a "preform," which while often highly brittle or frangible, is sufficiently self-supporting to retain its desired configuration temporarily, and with sufficiently careful handling. Such a preform is heated or sintered to set the plastic, resulting in a finished article which is neither porous nor brittle, but rather, extremely strong and substantially homogenous in texture. Similar techniques may also be employed to form articles from other types of particulate materials, e.g. metals, ceramics, etc.

Although the apparatus and methods disclosed in the aforementioned prior patents have been highly successful, there has been room for further improvement in the context of certain specific types of manufacturing projects.

For example, in the manufacturing of tubular goods, such as pipes, sleeves, fittings, etc., a manufacturer often has occasion to manufacture a number of different items which are more or less identical, except for diameters. For example, such a manufacturer may make pipes of various sizes and/or thicknesses. The mold in which the particulates are pressed to form the preforms is a relatively expensive item. It would be highly desirable to minimize the number of different molds which would have to be provided in order to make such items in many different sizes and/or thicknesses.

Another particular problem occurs where the item being formed is quite thick. In such instances, it is sometimes difficult to achieve a good quality article, with relatively uniform density, with a single pressing operation. In some cases in the past, it has been attempted to gradually build up a thick article by placing less particulates in the mold than required for the complete preform, pressing those particulates, adding more particulates, pressing again, etc. Thus, the preform would be built up in layers. The problem with this approach was that it resulted in seams or weakened areas at the junctures of the various layers, where the bonding was not sufficient to provide a good quality article.

Still another problem area is that of manufacturing long articles, specifically long tubular articles. Not only is a long mold expensive, bulky, etc., but once again, it is difficult to apply uniform pressure in such a mold, and consequently, difficult to achieve relatively uniform density in the finished product, particularly if the mold and product are tubular.

SUMMARY OF THE INVENTION

The methods and apparatus of the present invention address the aforementioned problems. While the invention is particularly advantageous in connection with the manufacture of tubular goods, certain aspects of the invention can also be applied to the manufacture of other kinds of articles.

In one aspect, the present invention comprises a particulate mold having opposed first and second wall means defining the particulate chamber therebetween. In many applications, the first and second wall means, and the particulate chamber, are annular. The second wall means, typically the outer wall means in an annular mold, is advancable and retractable toward and away from the first wall means.

The apparatus further comprises a plurality of chamber-reducing bodies removably mountable over each of the wall means. More specifically, these bodies may include a plurality of rigid sleeves which may be emplaced over a central mandrel defining the first wall means to vary the inner diameter of the particulate chamber. The chamber-reducing bodies further include a plurality of flexible, resilient liners which may be placed over the second wall means to vary the outer diameter of the particulate chamber. These liners are preferably formed of an elastomeric material, similar to that making up the second wall means itself. Liners and/or rigid sleeves can be added to or removed from the particulate chamber as needed, so that the same basic mold can be used to make products of different diameters and/or thicknesses.

It has been found, somewhat surprisingly, that even where a relatively large number of flexible liners for the outer movable wall means is provided, so that there is potentially a very great range of outer diameters for the particulate chamber, good quality preforms, and hence finished articles, can be obtained throughout such range. The use of the chamber-reducing bodies ensures that the second wall means may be advanced about the same distance, and with approximately the same pressure, regardless of the size or thickness of the article to be formed.

In connection with another aspect of the invention, a relatively thick preform can be incrementally built up, but without the detectable seams or weak areas referred to above. More specifically, a first batch of particulate material can be placed in the particulate chamber and the second wall means advanced with a first, relatively low, force, to lightly compress the first batch of material. The second wall means is then retracted, forming a space between the first batch of material and the second wall means. A second batch of material is placed in this space, and the second wall means is again advanced, but this time with a higher force, so that it not only compresses the second batch of material but further compresses the first batch of material. This process can be repeated as many times as necessary, using increasingly higher forces, or the same low force can be used for each of a series of pressings, with a higher force used for the very last pressing. In either case, new particulate material is never added to fully compressed material, but rather, is only added adjacent partially compressed material. The first light pressing(s) may eliminate a large portion of the air space in a batch of material. However, the highly irregular configurations of the particles allow for further interlocking with the material of the next batch upon further pressing.

The aforementioned flexible liners can be utilized to enhance such a process. A relatively large number of such liners may be emplaced over the second wall means for the first pressing operation. For successive pressing operations, more and more of these liners are removed, beginning with the innermost and progressing outwardly, to help create the spaces for emplacement of additional batches of particulate material. Thus, such use of the liners helps to ensure that an appropriate size space is provided for a limited amount of particulate material, and also that the underlying second wall means does not have to be advanced too far, in any one pressing operation, to jeopardize either its own structural integrity or the uniformity of the force applied to the particulate material.

In another aspect of the present invention, which may or may not utilize the aforementioned aspects, it becomes possible to make a relatively long article utilizing a short mold, by building up the preform in overlapping sections. A first batch of particulate material is placed in the particulate chamber of the mold, and pressed to form a first preform section. After the second wall means is retracted, this first preform section is displaced with respect to the particulate chamber, so that one end thereof extends out from the chamber, while the other end of the preform is disposed intermediate the ends of the chamber.

A second batch of material is then introduced into the particulate chamber, so that it overlaps the first preform section. The second batch is compressed to form a second preform section, bonded to the first section. The composite preform can then be further displaced, and further built up, in as many increments as necessary to form a preform of the desired length.

Preferably, different sections of the second wall means are adapted for applying different forces to the particulates in the chamber, with the forces decreasing from the center of the chamber to each end. Thus, after the first preform section is displaced with respect to the chamber, the portion of the preform in the center of the chamber will be relatively lightly compressed, but aligned with the high force part of the chamber. Then, when a second batch of material is pressed in overlapping relation to the first preform section, the lightly compressed portion of the first preform section within the mold will be further compressed along with an overlapping portion of the second batch of material, to form a good, strong, seamless joint.

To further enhance these effects, the second wall means may be tapered in areas which form preform portions destined to overlap other batches. The second wall means is preferably also designed to apply increasing forces in several increments.

The mold for performing such an operation may have its second wall means comprised of a number of elastomeric bladders arranged in end-to-end series longitudinally along the length of the chamber. The differing forces are exerted by inflating different bladders to different pressures.

The success of the above apparatus and methods has been particularly surprising in conjunction with the manufacture of tubular goods, while the salient effects thereof are particularly advantageous in that same context.

Accordingly, it is a principal object of the present invention to provide improved methods of making preforms and other self-supporting bodies from particulate materials.

Another major object of the present invention is to provide improved apparatus for making such bodies.

Another object of the present invention is to provide for the manufacture of tubular bodies of varying diameters in the same mold, without deviating from the optimum amount of advance of the movable one of the two opposed chamber walls.

Still another object of the present invention is to provide for the incremental formation of a relatively thick body, utilizing successive low and high forces, to substantially eliminate weak seam areas in the finished product.

Yet a further object of the present invention is to provide for the making of long bodies, utilizing relatively short molds, by incrementally building on body sections in lengthwise overlapping relation to one another.

Still other objects, features and advantages of the present invention will be made apparent by the following detailed description, the drawings and the claims.

DETAILED DESCRIPTION

Figure 1:
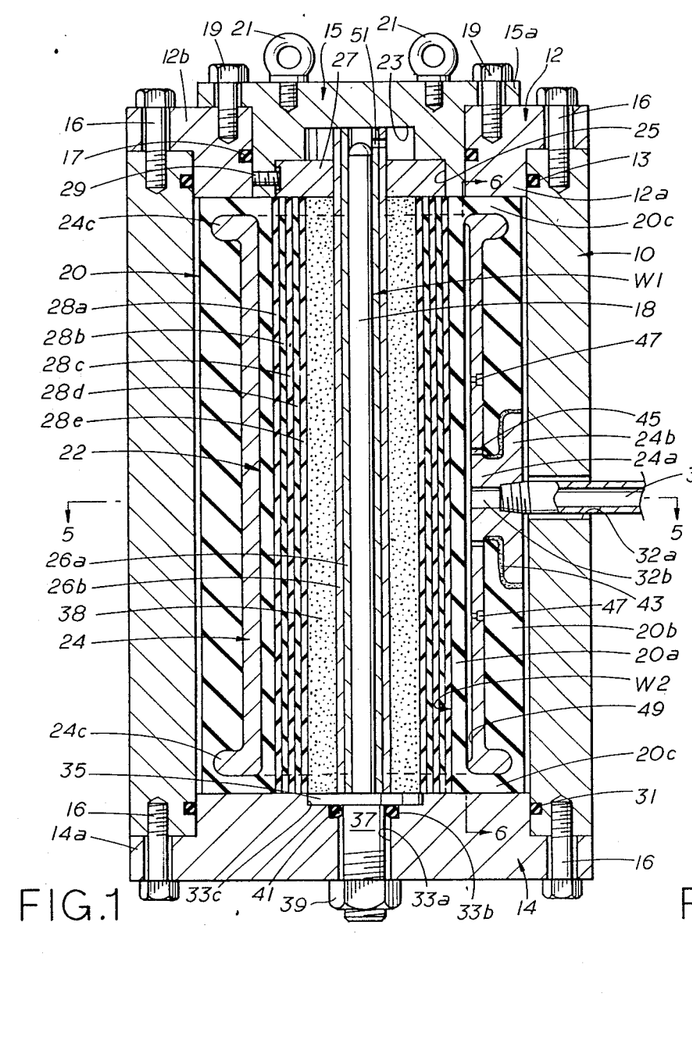
FIGS. 1-4 are longitudinal cross-sectional views through an annular type mold according to a first embodiment of the invention, showing successive steps in a molding operation.

Referring first to FIG. 1, there is shown, somewhat diagrammatically, a particulate mold body or housing including a cylindrical side member 10 and end members 12 and 14. End members 12 and 14 are removably secured to side member 10 as by bolts 16.

Upper end member 12 is generally annular, having a cylindrical end 12a which fits into side member 10 and is sealed with respect thereto by an O-ring 13. A flange 12b extends radially outwardly at the other end of member 12, overlying the upper end of member 10 and receiving bolts 16. A closure member 15 in turn fits into the central opening of member 12 and is sealed with respect thereto by an O-ring 17. A flange 15a extending radially outwardly at the upper end of member 15 overlies the top of member 12 and is secured thereto by bolts 19. A pair of lift rings 21 are screwed into the top of member 15 for emplacing and removing member 15. Member 15 has a central recess 23 communicating with a counterbore-like enlargement 25 opening through the lower end of member 15. A centralizing ring 27 is removably secured in counterbore 25 by set screw 29, for a purpose to be explained more fully below.

Lower end member 14 is likewise annular, extending into side member 10 and being sealed with respect thereto by O-ring 31. Flange 14a extends radially outwardly at the outer end of member 14, overlying the lower end of member 10 and receiving bolts 16. The central throughway in annular end member 14 includes a main bore 33a, a first counterbore 33b disposed at the inner end of main bore 33a, and a second counterbore 33c at the innermost extremity of member 14. Counterbore 33c receives a support plate 35. Counterbore 33b receives an O-ring seal 41. Bolt 37 extends through main bore 33a and seal 41 into engagement with the underside of plate 35. The other end of bolt 37 protrudes through the bottom of the mold and is engaged by a nut 39 which retains the bolt in place. (For purposes of the present description, terms such as "top," "bottom," "underside," etc. will be used, for convenience, with reference to the apparatus as shown in the drawings. However, it should be understood that, in actual use, the apparatus might be disposed in another orientation. Thus, such terms are not to be construed in a limiting sense.

An annular or cylindrical chamber is defined in the interior of the mold body 10, 12, 14. A first or inner annular lateral wall W1 of this chamber is defined by a rigid mandrel 18 extending longitudinally through the center of the mold. The upper end of mandrel 18 extends into recesses 23, 25 of closure member 15; the lower end rests on support plate 35.

The second or outer annular lateral wall W2 is defined by the radially inner portion 20a of an elastomeric bladder 20. The outer portion 20b of bladder 20 is annular and lies parallel to portion 20a. The upper and lower ends of portions 20a and 20b are connected by end portions 20c to form annular fluid chamber means 22.

As explained more fully in the aforementioned prior U.S. Pat. Nos. 4,252,760 and 4,263,237, when the mold is designed to form a convoluted or otherwise irregularly shaped article, the various annular members making up the mold may be formed in pairs of semi-annular parts. For example, the fluid chamber means 22 could actually be comprised of a pair of semi-annular fluid chambers, each defined within a respective semi-annular bladder. However, in the embodiment shown, which is designed to form a smooth walled sleeve or tube, the bladder 20 may be a continuous annulus, as are the fluid chamber 22 defined therein and the surrounding side member 10.

An annular core 24 is disposed within bladder 20. Core 24 may be comprised of metal, as shown, or of other rigid materials, such as suitable plastics. The bladder 20 is actually formed about its core 24. Outer portion 20b and end portions 20c of the bladder may be bonded to core 24, although in the embodiment shown, the only bond is at 43, described below. In any event, the inner portion 20a of bladder 20, which forms the movable outer wall W2 of the particulate chamber, should not be bonded to the adjacent surface of core 24. Thus, the fluid chamber 22 included within bladder 20 is, more specifically, defined between core 24 and inner portion 20a of the bladder.

Core 24 has radially outwardly extending lips 24c at its ends for enhanced strength and better support of the elastomeric bladder 20. On one side, core 24 has a lengthwise groove 49 in its inner wall portion 20a, stopping just short of the axial ends of core 24. In the area aligned with groove 49, core 24 has an extension 24a projecting radially outwardly through the outer portion 20b of bladder 20, the projection being enlarged at 24b where it forms a continuous surface with the outer surface of portion 20b of the bladder. Projection 24a is bonded to bladder portion 20b through which it extends as indicated at 43.

Figure 6:
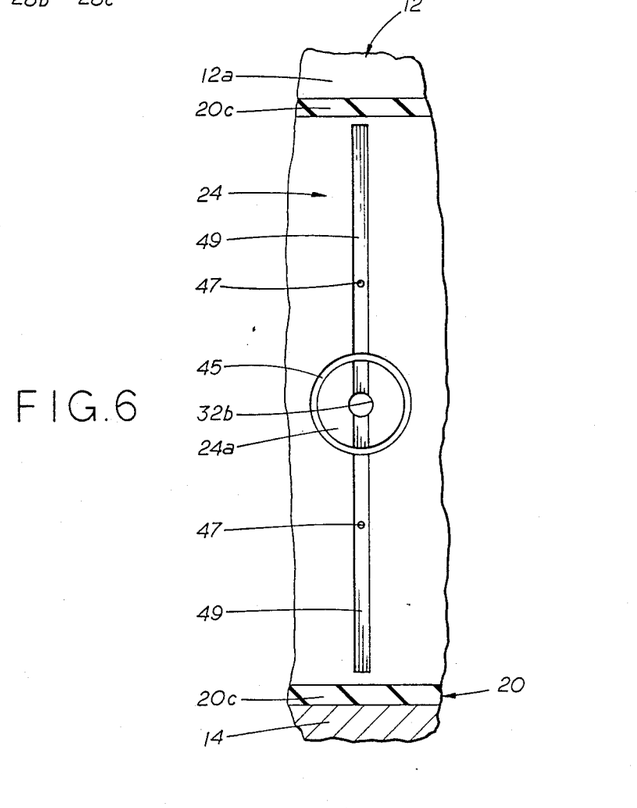
FIG. 6 is a detailed view taken on the line 6—6 of FIG. 1.

An annular slit 45 (see FIG. 6) separates projection 24a and the part of core 24 immediately inward thereof from the remainder of the core. This slit 45 in the core allows a limited amount of articulation between the two respective parts, as will be explained more fully below, but does not prevent the projection 24a and the part of the core integral therewith from effectively functioning as part of core 24. Thus, for purposes of this specification, projection 24a will be considered a part of the core 24 despite the presence of slit 45.

Core 24 also has several ports 47 extending radially therethrough in the area communicating with groove 49, for a purpose to be described more fully below.

Aligned radial ports 32a and 32b extend respectively through body member 10 and the part of core 24 including projection 24a. This allows a tubular fitting 34 to be threaded into port 32b. A supply line (not shown) may be connected to fitting 34, in a well known manner, to allow pressurized fluid to be introduced to fluid chamber 22 for advancing inner bladder portion 20a toward mandrel 18. Conversely, when fluid is vented through line 34, the resilience of bladder 20 will cause its inner portion 20a to collapse against core 24, thereby retracting away from mandrel 18. There is sufficient clearance between bladder 20 and member 10 to allow assembly thereof, the clearance being shown exaggerated in FIG. 1. Also, a fairly generous clearance between port 32a and fitting 34 is permissible without ill effects.

As mentioned, the outer surface of mandrel 18 and the inner surface of bladder portion 20a define the inner and outer annular walls W1 and W2 of the particulate chamber of the mold. The precise dimensions of the particulate chamber can be varied utilizing a number of chamber-reducing bodies. More specifically, in order to vary the inner diameter of the particulate chamber, and thus of the preform to be made, one or more chamber-reducing sleeves can be emplaced over mandrel 18. Two such sleeves are shown at 26a and 26b. It will be appreciated that, to even further increase the inner diameter of the particulate chamber, a third sleeve could be placed over sleeve 26b. As many sleeves as necessary to achieve the desired inner diameter can be thus emplaced, in coaxially surrounding relation to one another, i.e. in series progressing radially outwardly through the particulate chamber. Like mandrel 18, the sleeves 26a and 26b associated therewith are preferably formed of a rigid material, such as a suitable metal. As shown in FIG. 1, ring 27 is pre-selected so that its central bore will slidably engage sleeve 26b, which extends therethrough into recess 23 of member 15. If more sleeves, or a larger sleeve, are to be used, ring 27 is replaced by a similar ring having a larger inner diameter. Conversely, when mandrel 18 is to be used alone, without any surrounding sleeves, or with only sleeve 26a ring 27 may be replaced by a similar ring having a smaller inner diameter. Recess 23 is large enough to accommodate the largest of the sleeves designed to be used with a given mold. Small radial bores 51 near the upper end of sleeves 26a and 26b facilitate installation and removal.

To vary the outer diameter of the particulate chamber, one or more cylindrical liners may be emplaced over inner bladder portion 20a. FIG. 1 illustrates five such liners 28a–28e, arranged in coaxial series progressing radially inwardly from bladder portion 20a. Liners 28a–28e are formed of a suitable flexible, resilient material, preferably an elastomer such as the one of which bladder 20 is formed. Good results have been obtained using polyurethanes, both in bladder 20 and its liners 28a–28e.

FIGS. 1–4 illustrate a first mode of utilizing the apparatus, including the chamber-reducing bodies 26a, 26b and 28a–28e, to incrementally build up a relatively thick-walled tubular preform, without weakened areas or seams in the finished preform. Closure member 15 of the mold is removed, chamber-reducing bodies 26a, 26b and 28a–28e emplaced, and a first batch 38 of particulate material, such as a suitable polytetrafluoroethylene, is emplaced in the particulate chamber defined between walls W1 and W2, but reduced in dimension by the chamber-reducing bodies 26a, 26b and 28a–28e. The upper end of the mold is then closed by replacing member 15, so that the apparatus is in the condition illustrated in FIG. 1.

Figure 2:
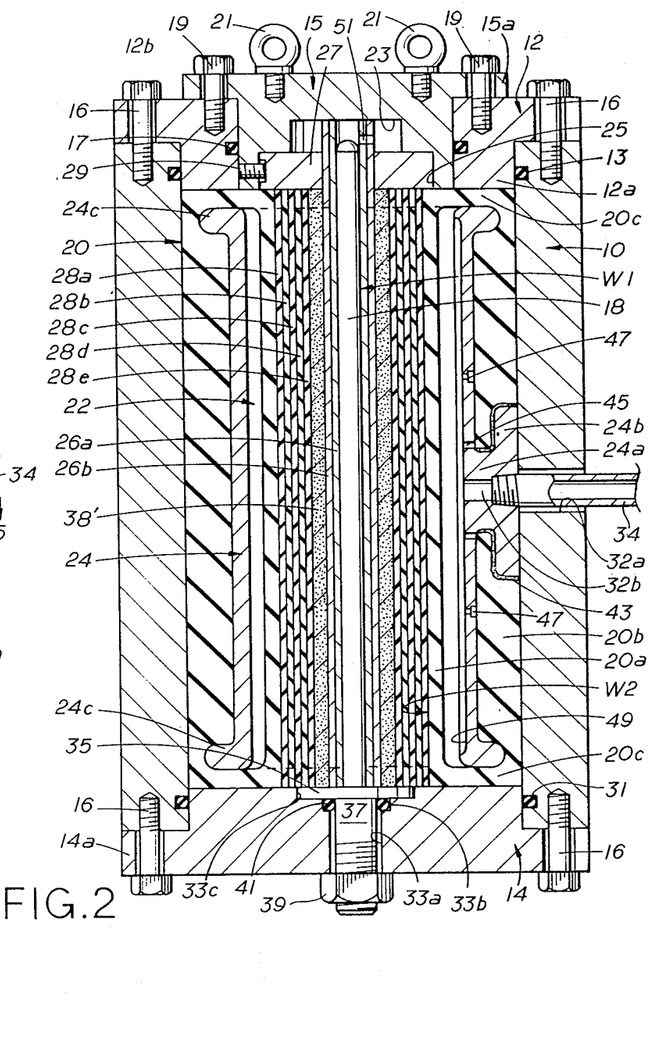

Next, as shown in FIG. 2, fluid is introduced to chamber 22 through fitting 34 and port 32b. This expands chamber 22, by stretching bladder 20, and advancing its inner portion 20a radially inwardly toward mandrel 18. Groove 49, which may be initially packed with grease, helps to ensure that the fluid pressure is distributed over virtually the entire length of bladder portion 20a. The bonding at 43 prevents fluid pressure from leaking out of bladder 20 along projection 24a. In addition to advancing bladder portion 20a radially inwardly, the fluid pressure will also cause outer bladder portion 20b to move outwardly taking up the clearance between itself and member 10. The articulation provided by slit 45 allows the portion of core 24 including projection 24a likewise to move radially outwardly. It has been found that bonding only along the interface between bladder portion 20b and the projection 24a (including its enlarged outer area 24b) produces better results than bonding the entire outer surface of core 24 to bladder portion 20b. The latter arrangement could cause problems, as by the fluid pressure tending to gouge out a concavity in the elastomeric material as it attempts to ram the corners or upper and lower ends of the core 24. No such problems have been experienced with the limited bonding arrangement illustrated in FIG. 1, particularly as ports 47 allow equalization of pressure as between the inner and outer sides of core 24.

The advancing of bladder portion 20a and bodies 28a–28e in turn compresses the particulate material in first batch 38. The first advancing is performed at a relatively low pressure, so as to lightly compress batch 38 of material into a relatively delicate first preform section, as shown at 38'.

It is noted that, due to the presence of liners 28a–28e, it is only necessary to advance inner bladder portion 20a a relatively short distance in order to form the first preform section 38', even though that section has a relatively small outer diameter. It is also noted that the resilient, flexible liners 28a–28e, due to their flexibility and resilience, are enabled to advance with bladder portion 20a. It has been found, somewhat surprisingly, that such liners can be used, even in the formation of tubular or annular preforms, without problematic buckling, i.e. leaving a relatively smooth outer wall on the preform section 38'.

In the next step, the pressurized fluid is vented from chamber 22 through fitting 34, and bladder portion 20a retracts, along with its resilient liners 28a–28e. Here, ports 47 and groove 49 play an even more important role, ensuring that no pressurized fluid is trapped within the bladder, and thus, that the bladder resumes its original deflated configuration. This leaves a space between preform section 38' and the outer wall W2 of the particulate chamber, as defined by bladder portion 20a and further reduced in diameter by liners 28a–28e. If necessary, in order to enlarge this space, one or more of the liners 28a–28e can now be removed. More specifically, in the exemplary operation illustrated, the top of the mold is reopened, and innermost liner 28e is removed. Then, a second batch 40 of particulate material is emplaced in the annular space between preform section 38' and liner 28d. The top of the mold is reclosed, leaving the apparatus in the condition of FIG. 3.

Next, as shown in FIG. 4, fluid is again introduced to chamber 22, advancing bladder portion 20a and liners 28a–28d. This time, the fluid is provided at a higher pressure, so as to apply a greater force to bladder portion 20a, through liners 28a–28d, to the material in the particulate chamber. Due to the use of such higher force, this second advancing of bladder portion 20a not only compresses the material of second batch 40, but also further compresses the material of the first batch 38, now preform section 38', blending the two batches together into a relatively tightly compressed, seamless preform 40'.

Figure 4:
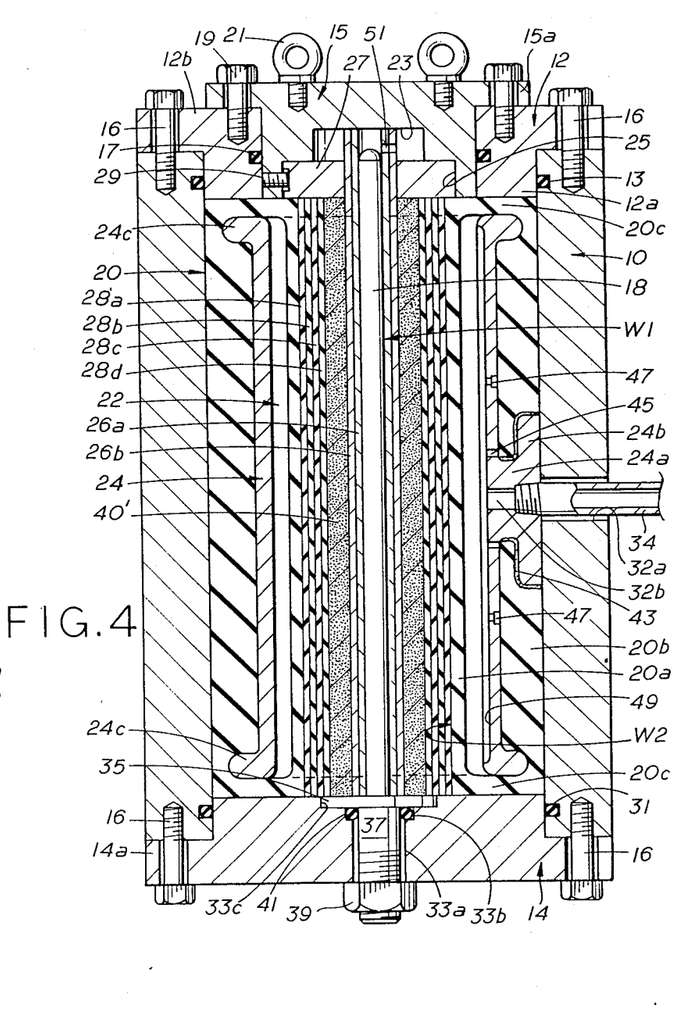
Figure 5:
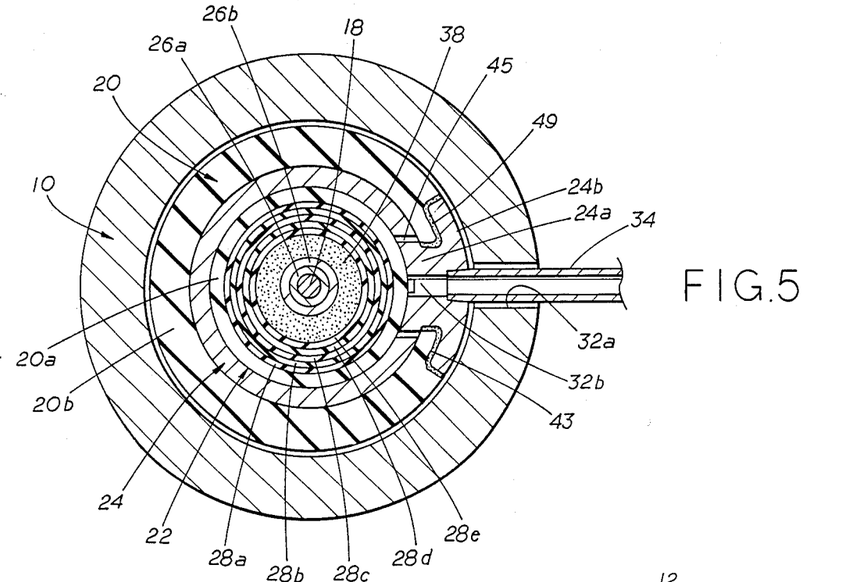
FIG. 5 is a transverse cross-sectional view taken on the line 5—5 of FIG. 1.

Preform 40' can then be sintered, in the usual manner, to produce a finished sleeve or tube.

Figure 3:
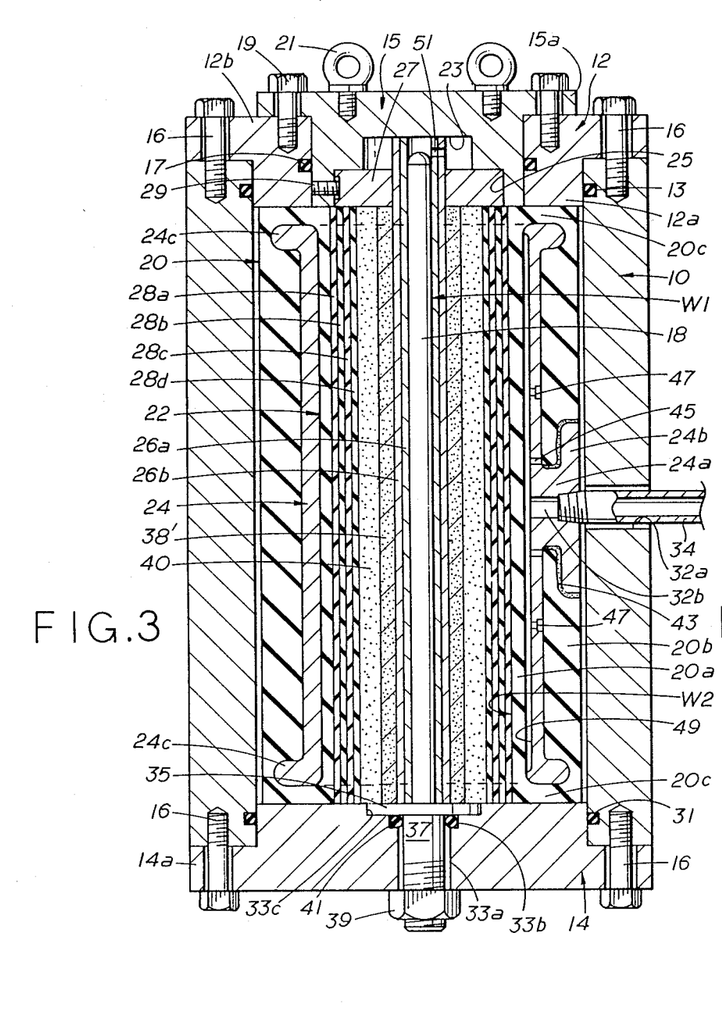

It will be appreciated that, if it were desired to make an even thicker walled tubular preform, the steps illustrated in FIGS. 2–4 could be repeated, removing still another liner, specifically 28d, before emplacing a third batch of material and again advancing the bladder. Indeed, this process could be repeated as many times as necessary in order to build up a very thick, seamless preform. Depending upon the precise thickness of the body to be formed, the precise materials being employed, and other parameters, the fluid pressure might be increased incrementally each time the bladder is advanced in such a series; on the other hand, it might be appropriate, in some cases, to advance the bladder at the same, relatively low, pressure for each batch of material except the last. In any case, the last advancing of the bladder should always be at a higher pressure than any of the preceding advancings, so that, during the last of the pressing operations, all the material in the mold cavity is compressed.

Chamber-reducing bodies, such as 26a, 26b and 28a–28e, can also be used to make articles of different diameters and/or thicknesses utilizing the same basic mold apparatus. For example, beginning with the apparatus in the condition of FIG. 1, a first preform could be made. If it were then desired to make another preform of smaller inner and outer diameters, the first preform could be removed, sleeve 26b removed, and another liner emplaced within liner 28e. The pressing process could then be repeated. Conversely, if after using the apparatus in the condition of FIG. 1 it were desired to make a preform with larger inner diameter and outer diameter, another sleeve could be emplaced over sleeve 26b, while removing one or more of the liners 28a–28e. It can also be seen that, by proper choice of chamber-reducing bodies, the thickness of the preform to be made can be varied, regardless of whether or not such preform is intended to be incrementally built up with multiple batches of particulates, or is to be thin enough that it can be formed from a single batch.

The chamber-reducing bodies can be used to ensure that bladder portion 20a need only be advanced a relatively small distance each time it is pressurized, without regard to the diameters of the preform being made. This not only ensures the structural integrity and long life of bladder 20, but also helps to ensure uniform force over the surface area of the preform, resulting in a good quality preform, of relatively uniform density.

In some instances, it may be possible to build up a thick-walled preform in layers without the use of sleeves 28a-28e, so long as the first few pressing operations are performed at a sufficiently low pressure to avoid damage to bladder 20. In such instances, the bladder 20, when inflated and advanced, may bulge more near its center than near its axial ends, resulting in a somewhat hour glass outer profile to the resulting preform section(s). This will be automatically corrected as subsequent layers are added, and the preform will eventually assume a cylindrical outer profile. In other instances, it might be possible to build up a thick-walled article by successively removing inner chamber-reducing bodies such as 26a and 26b between pressings.

Figure 7:
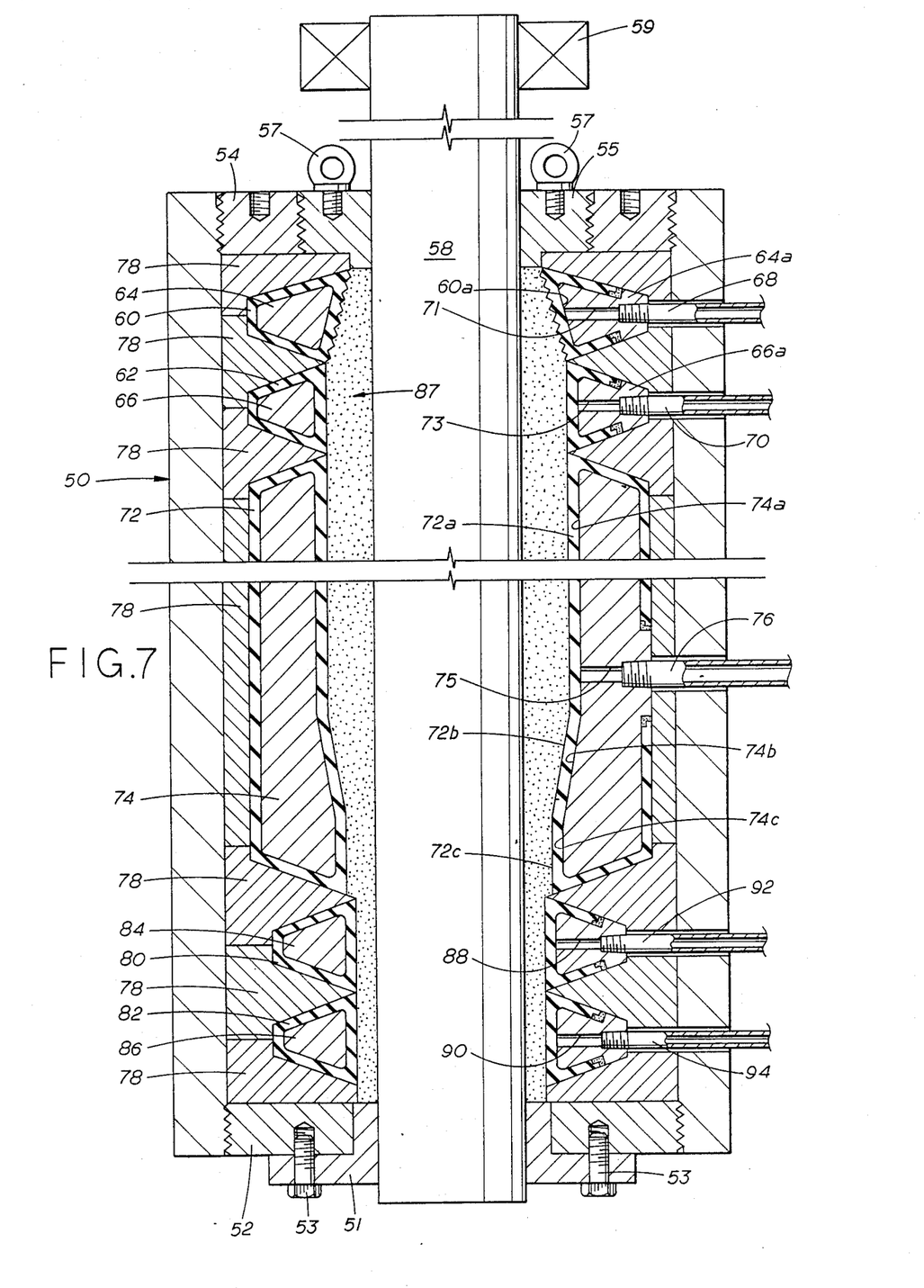
FIGS. 7, 8 and 9 are longitudinal cross-sectional views through a second embodiment of mold according to the present invention, showing successive steps in a molding operation, FIG. 9 being on a reduced scale from that of FIGS. 7 and 8.
Figure 8:
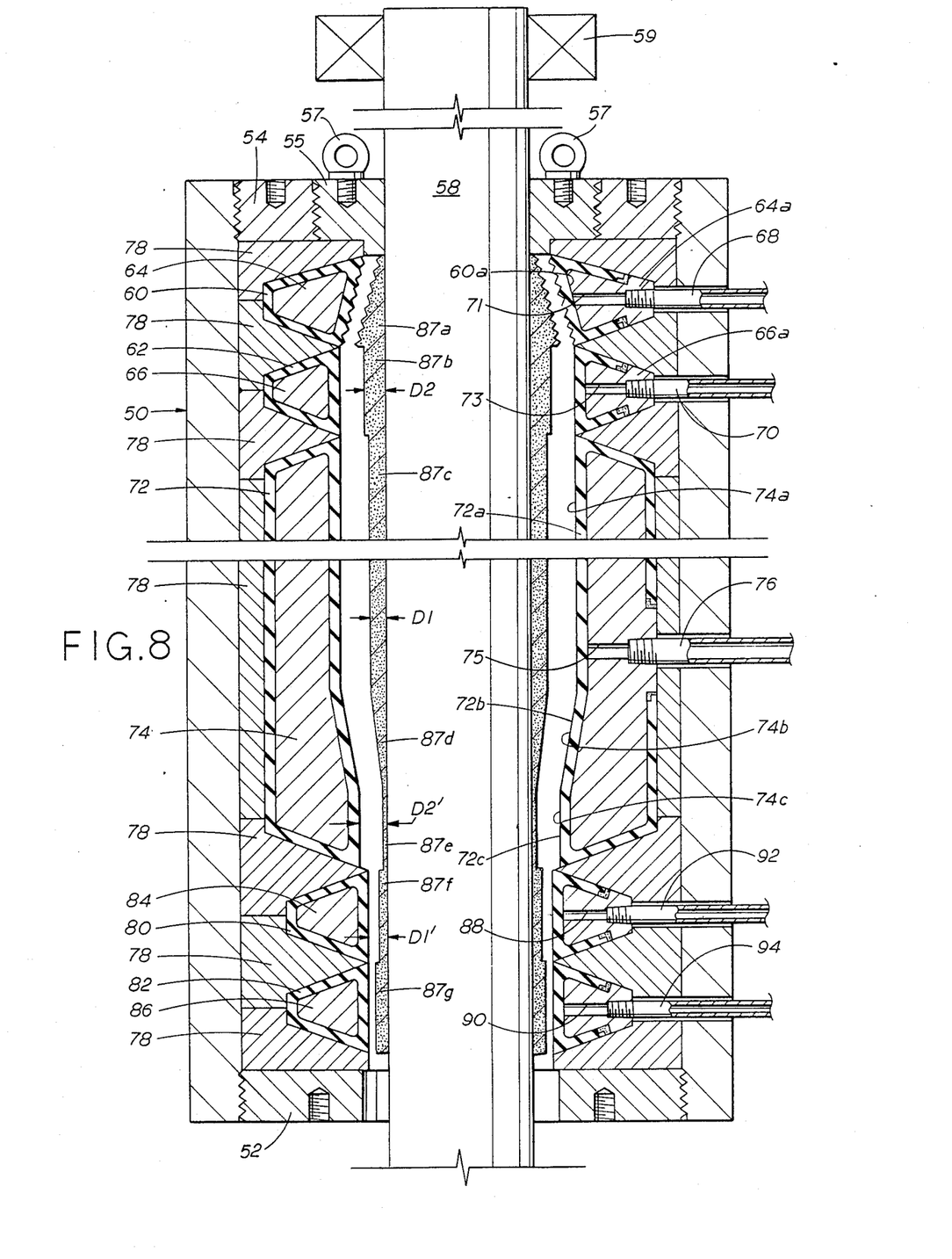
Figure 9:
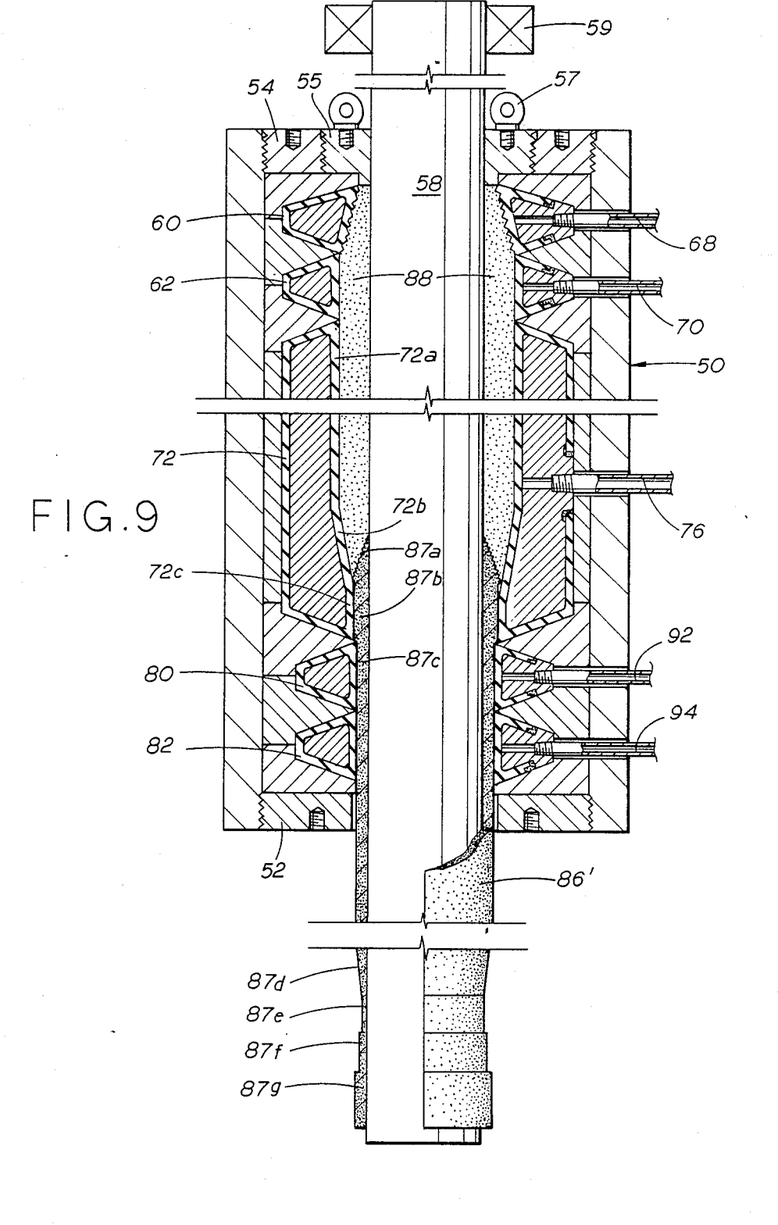

Referring now to FIGS. 7, 8 and 9, there is shown another embodiment of mold according to the present invention. The embodiment of FIGS. 7-9 is adapted for building up a relatively long tube, utilizing a relatively short mold. The mold body includes the outer cylindrical side member 50, lower end member 52, and upper end member 54. The end members 52 and 54 may be secured to the side member 50 in any suitable manner, as shown they are threaded into side member 50.

For convenience in emplacing, removing, and/or shifting various materials and bodies utilized within the mold, each of the members 52 and 54 has a central opening. An annular member 51 has a cylindrical portion extending into the bore of end member 50 and a flange extending radially outwardly at the outer end and overlying member 52 so that the two members can be secured together by bolts 53. An annular closure member 55 is threaded directly into upper end member 54. Handling rings 57 are threaded into member 55 for ease in emplacing or removing it. Member 55 can be removed when filling the mold with particulate material without the need to remove the entire upper end member 54. Likewise, member 51 can be removed, as needed, without removing the entire lower end member 52.

A central mandrel 58 is slidably mounted in end members 51 and 55. Mandrel 58 is much longer than the mold cavity. More particularly, mandrel 58 is the length of the tubular body ultimately to be formed, or slightly longer. In an initial position for starting up the operation, mandrel 58 is positioned with respect to the mold cavity body as shown in FIG. 7, i.e. so that one end protrudes just slightly through member 51. Mandrel 58 may be supported in this position in any well known manner, as diagrammatically indicated by the annulus 59.

Mandrel 58 defines the inner or fixed wall of the particulate chamber of the mold. The outer wall is defined by a plurality of annular bladders arranged end-to-end in series progressing longitudinally through the interior of the mold. Beginning at one end of the mold (the top end as shown in the Figures), there are a series of relatively short annular bladders. In the simplified embodiment shown, there are two such bladders 60 and 62. In actual practice, a greater number would probably be used. Except for size and shape, these bladders and their relationship to the remainder of the mold are similar to the bladder 20 of the first embodiment and, to that extent, will not be described in great detail.

Briefly, each of the bladders 60 and 62 has a respective annular core 64 or 66. Each core is bonded to the interior surfaces of its respective bladder along a radial projection 64a or 66a, respectively. Each bladder has a fluid supply line communicating, through a respective bore in the mold member 50 and a respective port 71 or 73 through the core and its projection with the fluid chamber defined between the bladder's inner portion and its core. The fittings for the respective fluid supply lines are shown at 68 and 70.

The upper bladder 60 differs from that of the preceding embodiment in that it has a varying or tapered inner diameter. More particularly, the upper bladder 60 defines a tapering outer diameter for the particulate chamber, beginning with a minimum diameter at the upper end of bladder 60 and increasing downwardly or toward the other end of bladder 60. In addition, the innermost surface of the upper bladder 60 is serrated or threaded as shown to produce an irregular surface in the preform, for a purpose to be described below. The upper and lower surfaces of bladders 60 and 62, and their respective cores, are tapered toward each other from their inner to their outer extremities, resulting approximately in irregular trapezoidal cross-sectional configurations, as shown. Rigid spacers 78 are provided to fill the gaps between adjacent bladders and the gaps between the bladders and the mold body members 50, 52 and 54.

The bladders and their cores may be provided with other features described in connection with the preceding embodiment, such as articulation slits, fluid distribution grooves, fluid equalization ports, etc. as needed, but such features are not illustrated herein for simplicity and clarity sake.

Just below bladder 62 is a longer bladder 72 with a respective core 74 therein. The inner portion 72a of bladder 72 and the underlying inner surface of its core 74 include upper cylindrical sections 72a and 74a whose diameters are equal to the corresponding diameters of bladder 62 and its core 66, frustoconical sections 72b and 74b whose diameters decrease from top to bottom, and smaller diameter cylindrical sections 72c and 74c. A fitting 76 extending through body member 50 is threaded into the projecting part of core 74 to communicate with port 75, and thence the fluid chamber defined between core 74 and the inner portion 72a through 72c of bladder 72.

Located below bladder 72 are a series of small bladders 80 and 82 with their respective cores 84 and 86, ports 88 and 90, and fittings 92 and 94. Bladders 80 and 82 are similar to bladder 62 except that the inner diameters are slightly smaller than the corresponding diameters of sections 72c and 74c just above.

Since each of the bladders 60, 62, 72, 80 and 82 has its own respective fluid chamber and fluid supply line, the different annular sections of the outer wall of the particulate chamber defined by respective ones of these bladders can be made to apply different forces. More specifically, in a typical operation, a first batch of particulate material 87 is emplaced in the particulate chamber defined between the bladders and the mandrel 58. Fluid is supplied simultaneously through fittings 68, 70, 76, 92 and 94, but at different pressures, the pressures increasing from the ends of the particulate chamber to the center.

For a typical polytetrafluoroethylene material, a pressure of about 500 psi might be applied to inner portion 60a of bladder 60; a higher pressure, about 2,500 psi, might be applied to the second bladder 62; the highest pressure, about 5,000 psi, would be applied to bladder 72; a pressure of about 3,000 psi could be applied to bladder 80; and a pressure of about 800 psi could be applied to bladder 82. These pressures are merely exemplary, and it would be desirable, in some instances, to use different pressures, particularly if some other type of particulate material is being molded.

FIG. 8 shows the apparatus after the first batch of particulate material has been compressed, and the bladders retracted, leaving a preform in the mold cavity. The preform has several sections corresponding to the various bladder sections. Specifically, the preform includes a lightly compressed and externally tapered upper section 87a formed by and lying adjacent bladder 60. Section 87b, adjacent bladder 62, is a cylindrical section, and because of the higher pressure of bladder 62 as compared with bladder 60, the outer diameter of section 87b is slightly smaller than the diameter at the lower end of section 87a, and the powder in section 87b is somewhat more tightly compressed. A section 87c, of even smaller diameter, corresponds to section 72a of bladder 72, and is fully compressed. Conical section 87d formed by bladder section 72b is likewise fully compressed. Adjacent bladder section 72c is a very small, thin, but tightly compressed, section 87e of the preform. Cylindrical section 87f therebelow is of slightly greater outer diameter, due to the lower pressure of bladder 80. Likewise, section 87d formed by bladder 82 is a lightly compressed cylindrical section of slightly greater diameter than section 87f.

After the first batch of material has been pressed, member 51 is removed, and mandrel 58, with the first preform thereon, is lowered to the position of FIG. 9. More specifically, section 87a of the preform is aligned with section 72b of bladder 72; section 87b of the preform is aligned with section 72c of bladder 72; section 87c of the preform is aligned with bladders 80 and 82, and further extends outwardly from the mold cavity. Thus, sections 87d through 87g are likewise disposed outside the mold cavity; these last preform sections will eventually be removed so that the end of the tube in question is formed by the tightly compressed cylindrical section 87c.

The outer diameters of the various sections of the preform can be predetermined, and are coordinated with the inner diameters of the various bladders and bladder sections. More specifically, the inner diameter of bladder section 72c is designed for easy sliding fit on section 87b of the preform, while the inner diameters of bladders 80 and 82 are sized for an easy sliding fit on section 87c of the preform. Thus, the preform can easily be moved into the position of FIG. 9, but when a second batch 88 of particular material is loaded into the mold cavity, there will not be enough clearance between preform section 87b and bladder section 72c for any substantial amount of particulate material to enter therebetween. There is even less chance that particulate material will enter the slight clearance between bladders 80 and 82, on the one hand, and preform section 87c, on the other hand. Thus, from this point on, bladders 80 and 82 will serve primarily as seals which allow a gradual transition from the high pressure of bladder 72 to the atmospheric pressure outside the mold.

After a second batch 88 of particulate material is introduced into the particulate chamber, the mold is again closed. All bladders are again advanced, utilizing varying pressures as before. The second batch 88 of particulate material will form a second preform increment, having a lightly compressed upper portion, and a tightly compressed lower portion. Because portions 87a and 87b of first preform increment are now disposed in the high force bladder 72, they will be further compressed, along with the overlapping portion of second batch 88 of material, resulting in a blending and a seamless joint, as in the method of FIGS. 1–4. This is further ensured by the serrations of portion 87a.

The steps can be repeated as many times as necessary to build up a preform of any desired length. When the desired length is reached, the preform can be completed either by placing particulates only in the portion of the particulate chamber defined by bladder 72, with a suitable filler in the upper portion, for the last pressing step. Alternatively, the last-formed upper portions of the last preform section, formed by bladders 60 and 62, can be removed before or after sintering.

Numerous other variations on the exemplary embodiments described and illustrated above are possible. For example, certain aspects of the embodiment of FIGS. 1–6 can be combined with certain aspects of the embodiment of FIGS. 7–9. More particularly, the apparatus of FIGS. 7–9 could be provided with chamber-reducing bodies to allow for variation in the diameters of the preforms which can be made therein.

Still other modifications will suggest themselves to those skilled in the art. Accordingly, it is intended that the scope of the present invention be limited only by the claims which follow.

What is claimed is:

1. A method of making a self-supporting body from a particulate material, comprising the steps of:
   a. placing a first batch of such material in a particulate chamber having opposed first and second wall means, said second wall means being advancable and retractable toward and away from said first wall means, and said second wall means having one low force section adjacent one end of said chamber and a high force section distal said one end of said chamber;
   b. applying a fluid pressure of a first magnitude to said low force section of said second wall means to advance said second wall means toward said first wall means while simultaneously applying a fluid pressure of a second magnitude, greater than said first magnitude, to said high force section of said second wall means to advance said high force section toward said first wall means, so as to form a self-supporting body of said particulate material, lightly compressed adjacent one end and more tightly compressed distal said one end;
   c. retracting said second wall means from said first wall means to form a space between said first batch of said material and said second wall means;
   d. after so retracting said second wall means, displacing said self-supporting body with respect to said particulate chamber so that said lightly compressed portion is aligned with said high force section of said second wall means;
   e. placing a second batch of said material in said space; and
   f. applying a fluid pressure of said second magnitude to said high force section of said second wall means to advance said second wall means toward said first wall means and more tightly compress said portion of said first batch of material along with at least a portion of said second batch of material while simultaneously applying a fluid pressure of said first magnitude to said low force section of said second wall means to advance said low force section toward said first wall means and lightly compress the portion of said second batch of material adjacent thereto.

2. The method of claim 1 wherein said pressures are applied to said second wall means by introducing fluid to fluid chamber means on the opposite side of said second wall means from said particulate chamber.

3. The method of claim 2 wherein:
a flexible, resilient member comprises said second wall means and also at least partially defines said fluid chamber means;
said resilient member is stretched when said pressures are applied; and
said second wall means is so retracted by removing fluid from said fluid chamber means.

4. The method of claim 1 including using a tetrafluoroethylene as said material.

5. A method of making a self-supporting body from a particulate material, comprising the steps of:
a. placing a first batch of such material in a particulate chamber having opposed first and second wall means, said second wall means being advancable and retractable toward and away from said first wall means, and said second wall means having a high force section generally adjacent the center of said chamber, two low force sections adjacent respective ends of said chamber, and two intermediate force sections each located between the high force section and a respective one of the low force sections;
b. simultaneously applying a relatively high force per unit area to said high force section of said second wall means applying lower forces per unit area to the low force sections of said second wall means, and applying to said intermediate force sections of said second wall means forces per unit area which are intermediate that of the high force section and those of the respective adjacent low force sections to advance said second wall means toward said fist wall means, so as to form a self-supporting body of said particulate material, tightly compressed adjacent the center and incrementally more lightly compressed toward the ends;
c. retracting said second wall means from said first wall means to form a space between said first batch of said material and said second wall means;
d. after so retracting said second wall means, displacing said self-supporting body with respect to said particulate chamber so that the lightly compressed portions adjacent one end are aligned with said high force section of said second wall means;
e. placing a second batch of said material in said space; and
f. again applying such relatively high force per unit area to said high force section of said second wall means to advance said second wall means toward said first wall means and more tightly compress said lightly compressed portions of said first batch of material along with a portion of said second batch of material while simultaneously applying such lower forces per unit area to said low force sections of said second wall means and applying such intermediate forces per unit area to said intermediate force sections.

6. The method of claim 5 including forming said self-supporting body with a taper on the side adjacent the low force section of said second walls means which forms said lightly compressed portion adjacent said one end, the diameter of said taper generally increasing toward said tightly compressed portion.

7. The method of claim 6 including forming irregularities in the surface of said taper of said self-supporting body.

8. The method of claim 6 wherein:
said particulate chamber is annular; and
said self-supporting body is formed as a tube.

9. The method of claim 5 wherein:
each of said sections of said second wall means is formed by a respective elastomeric member, each having a respective fluid chamber associated therewith on the opposite side thereof from said particulate chamber; and
said forces are applied by introducing fluid to the respective fluid chambers at different pressures.

10. The method of claim 5 including using a tetrafluoroethylene as said material.

11. A method of making a self-supporting body of particulate material, comprising the steps of:
a. in a particulate chamber having opposed first and second wall means, said second wall means being advancable and retractable toward and away from said first wall means, emplacing a chamber-reducing member over one of said wall means:
b. placing a first batch of such material in said particulate chamber;
c. applying a force to said second wall means to advance said second wall means toward said first wall means and compress at least a portion of said first batch of material between said chamber-reducing member and the other of said wall means;
d. retracting said second wall means;
e. removing said chamber-reducing member;
f. placing a second batch of said material in said particulate chamber between said first batch of material and said one wall means; and
g. re-advancing said second wall means to compress said second batch of material.

12. The method of claim 11 wherein said re-advancing is done with a force greater than that for said first advancing so as to further compress said first batch of material along with said second batch of material.

13. The method of claim 12 wherein step a comprises emplacing said chamber-reducing member over said second wall means for joint movement therewith.

14. The method of claim 13 wherein:
said second wall means is flexible and resilient;
said chamber-reducing member is flexible and resilient; and
the forces for advancing and re-advancing said second wall means are applied by introducing fluid to fluid chamber means on the opposite side of said second wall means from said particulate chamber.

15. The method of claim 14 wherein said retraction of said second wall means is done by removing fluid from said fluid chamber means.

16. The method of claim 15 wherein said particulate chamber is annular;

said first wall means is a rigid mandrel extending longitudinally through the center of said particulate chamber; and step a further comprises also emplacing a rigid chamber-reducing sleeve in coaxially surrounding relation to said mandrel.

17. The method of claim 13 wherein step a further comprises also emplacing another chamber-reducing member over said first wall means.

18. The method of claim 12 wherein step a comprises emplacing said chamber-reducing member over said first wall means.

19. The method of claim 11 wherein:
step a includes so emplacing one such chamber-reducing member directly over said one wall means and emplacing another such chamber-reducing member over said one chamber-reducing member;
step e comprises so removing said other chamber-reducing member; and
step g is followed by the steps of:
h. again retracting said second wall means;
i. removing said one chamber-reducing member;
j. placing a third batch of said material in said particulate chamber between said first batch of material and said one wall means; and
k. again re-advancing said second wall means with greater force than in steps c and g to further compress said first and second batches of material along with said third batch of material.

20. The method of claim 19 wherein the re-advancing of said second wall means in step g is done with a force intermediate those for steps c and k.

21. A method of making tubular self-supporting bodies of different diameters but otherwise similar inner and outer surface configurations comprising the steps of:
a. in an annular particulate chamber having opposed, inner and outer annular wall means, said outer wall means being advanceable and retractable toward and away from said inner wall means, emplacing a chamber-reducing member over one of said wall means to define a chamber-limiting surface parallel to but spaced from said one wall means;
b. placing a first batch of such material in said particulate chamber;
c. applying a force to said outer wall means to advance said outer wall means toward said inner wall means and compress said first batch of material between said chamber-reducing body and the other of said wall means to form a first self-supporting body;
d. retracting said outer wall means;
e. removing said first self-supporting body;
f. removing said chamber-reducing member;
g. placing a second batch of such material in said particulate chamber; and
h. re-advancing said outer wall means to compress said second batch of material and form a second self-supporting body, having at least one diameter differing from the corresponding diameter of said first self-supporting body.

22. The method of claim 21 wherein, when said first chamber-reducing member is removed from said one wall means, a second annular chamber-reducing member is emplaced over the other of said wall means prior to placing said second batch of material in said particulate chamber.

23. A mold for particulates comprising:

opposed first and second wall means defining a particulate chamber therebetween, said second wall means being advancable and retractable toward and away from said first wall means;
means for applying a force to said second wall means to advance said second wall means toward said first wall means; and
a plurality of chamber-reducing members removably mountable over each of said wall means and each having a configuration, on the side opposite the respective wall means, which generally parallels said respective wall means.

24. The apparatus of claim 23 wherein said particulate chamber and said first and second wall means are annular, said second wall means defining the radially outer wall of said particulate chamber.

25. The apparatus of claim 24 wherein said second wall means is flexible and resilient.

26. The apparatus of claim 25 comprising hollow bladder means defining fluid chamber means therein, inner portions of said bladder means forming said second wall means, and said force-applying means comprising means for introducing fluid into said fluid chamber means.

27. The apparatus of claim 26 wherein said force-applying means is adapted to apply varying forces to said second wall means.

28. The apparatus of claim 27 wherein said force applying means is adapted to vary the pressure of fluid introduced into said fluid chamber means.

29. The apparatus of claim 28 wherein said bladder means comprises a plurality of bladders disposed adjacent one another to jointly define said second wall means, and each having a respective fluid chamber therein, said force-applying means comprising means for introducing such fluid to different ones of said fluid chambers at respectively different pressures.

30. The apparatus of claim 29 wherein said bladders are arranged end-to-end in series longitudinally along said particulate chamber, and said means for introducing fluid at different pressures is adapted to apply increasingly higher forces on said second wall means from one end of said particulate chamber to the center of said particulate chamber.

31. The apparatus of claim 30 wherein said second wall means has a tapered section adjacent said one end with a diameter increasing from said one end toward said center.

32. The apparatus of claim 31 wherein said means for introducing fluid at different pressures is further adapted to apply increasingly higher forces on said second wall means from the other end of said particulate chamber to the center of said particulate chamber.

33. The apparatus of claim 31 wherein a central one of said bladders is adapted for application of a highest force, said central bladder defining a first cylindrical section of said second wall means closest to said one end of said particulate chamber, a second cylindrical section of said second wall means, of smaller diameter than said first cylindrical section, and disposed farthest from said one end of said chamber, and a tapered section of said second wall means interconnecting said first and second cylindrical sections.

34. The apparatus of claim 26 wherein said chamber-reducing members for said second wall means are flexible, resilient liners adapted to line said second wall means in coaxial series progressing inwardly from said second wall means.

35. The apparatus of claim 34 wherein said first wall means is defined by a rigid mandrel extending longitudinally through the center of said particulate chamber.

36. The apparatus of claim 35 wherein the chamber-reducing members for said first wall means are a plurality of rigid chamber-reducing sleeves of various diameters adapted to surround said mandrel and one another in coaxial series progressing outwardly from said first wall means.

37. The apparatus of claim 36 wherein said hollow bladder means include at least one annular hollow bladder, a rigid core having an annular portion disposed concentrically within the hollow of said annular bladder and a fitting portion extending radially outwardly through said bladder, and having a radial bore therethrough for introduction of fluid to said hollow inwardly of said core, said fitting portion being radially movable independently of the remainder of said core.

38. The apparatus of claim 37 wherein the annular portion of said core has at least one radial port therethrough.

39. The apparatus of claim 38 wherein said core has at least one longitudinal recess in its inner side communicating with the bore of said fitting portion.

40. A mold for particulates comprising:
opposed first and second wall means defining a particulate chamber therebetween, said second wall means being advancable and retractable toward and away from said first wall means; and
means for simultaneously applying varying fluid pressures to different sections of said second wall means to advance said second wall means toward said first wall means, said pressure applying means being adapted to apply increasingly higher forces per unit area on said second wall means from the ends of said particulate chamber to the center of said particulate chamber.

41. The apparatus of claim 40 wherein said particulate chamber and said first and second wall means are annular, said second wall means defining the radially outer wall of said particulate chamber.

42. The apparatus of claim 40 wherein said second wall means is flexible and resilient.

43. The apparatus of claim 41 comprising a plurality of wall sections disposed adjacent one another to jointly define said second wall means, said force-applying means comprising means for independently applying a distinct force per unit area to each respective one of said wall sections.

44. The apparatus of claim 42 comprising a plurality of hollow bladders, each defining a fluid chamber therein, the inner portion of each of said bladders forming a respective one of said wall sections, and wherein said force-applying means comprises means for introducing fluid into said fluid chambers.

45. The apparatus of claim 43 wherein said force-applying means comprises means for introducing such fluid to different ones of said fluid chambers at respectively different pressures.

46. The apparatus of claim 44 wherein said bladders are arranged end-to-end in series longitudinally along said particulate chamber.

47. The apparatus of claim 46 wherein said second wall means has a tapered section adjacent one end of said chamber with a diameter increasing from said one end toward the other end.

48. The apparatus of claim 47 wherein a central one of said bladders is adapted for application of a highest force, said central bladder defining a first cylindrical section of said second wall means closest to said one end of said particulate chamber, a second cylindrical section of said second wall means, of smaller diameter than said first cylindrical section, and disposed farthest from said one end of said chamber, and a tapered section of said second wall means interconnecting said first and second cylindrical sections.

49. The apparatus of claim 41 wherein said hollow bladder means include at least one annular hollow bladder, a rigid core having an annular portion disposed concentrically within the hollow of said annular bladder and a fitting portion extending radially outwardly through said bladder, and having a radial bore therethrough for introduction of fluid to said hollow inwardly of said core, said fitting portion being radially movable independently of the remainder of said core.

* * * * *

UNITED STATES PATENT AND TRADEMARK OFFICE
CERTIFICATE OF CORRECTION

PATENT NO. : 4,937,025

DATED : June 26, 1990

INVENTOR(S) : Robert D. Foster et al

It is certified that error appears in the above-identified patent and that said Letters Patent is hereby corrected as shown below:

In column 13, line 46, delete "fist" and insert therefor --first--.

In column 17, line 10, delete "36" and insert therefor --26--.

Signed and Sealed this

Twenty-fourth Day of September, 1991

Attest:

HARRY F. MANBECK, JR.

Attesting Officer

Commissioner of Patents and Trademarks